United States Patent Office 2,801,259
Patented July 30, 1957

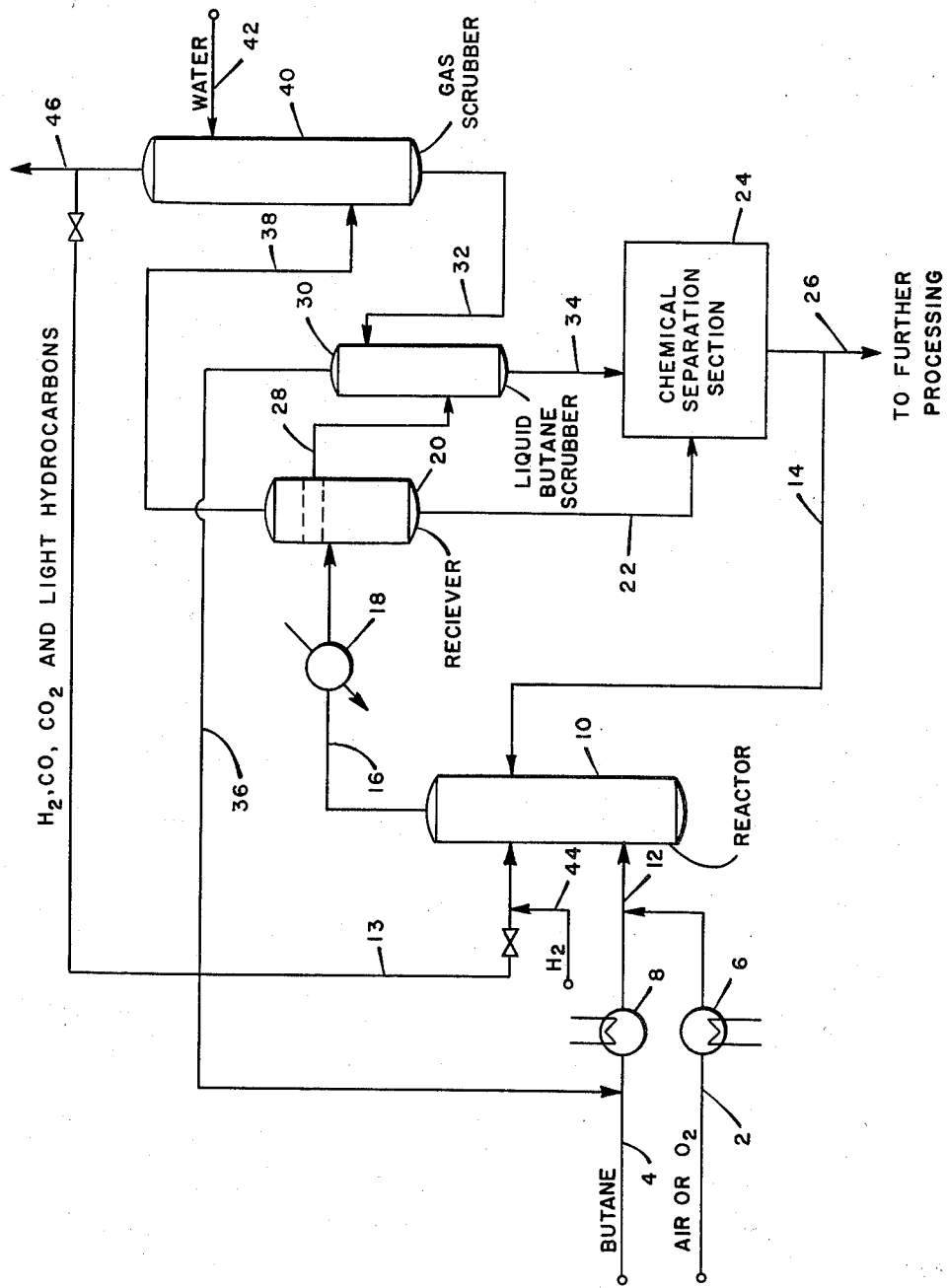

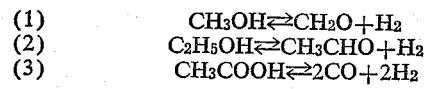

2,801,259

PARTIAL OXIDATION OF HYDROCARBONS

William C. Lake, Tulsa, Okla., assignor to Pan American Petroleum Corporation, a corporation of Delaware Application December 27, 1954, Serial No. 477,657

12 Claims. (Cl. 260—452)

The present invention relates to a method for conducting the vapor phase partial oxidation of hydrocarbons. More particularly, it is concerned with a procedure whereby the distribution of products resulting from such partial oxidation can be controlled.

In the conventional process for the vapor phase partial oxidation of hydrocarbons, the product chemicals usually comprise from about 55 to 65 percent aldehydes and ketones, with a major portion of this fraction being aldehydes; 20 to 25 percent alcohols, principally methanol; 4 or 5 percent esters; and, about 2 percent acids. Generally speaking, such a high proportion of aldehydes and ketones is undesirable because the demand for these classes of chemicals is not nearly as great as it is in the case of alcohols and acids. From the above figures, however, it is indicated that the most desirable classes of chemicals are produced in smaller portions than the products which generally are less in demand. Thus, it will be appreciated that, insofar as current partial oxidation procedures are concerned, the latter are relatively inflexible with respect to product class distribution and, hence, may become economically unattractive with changing market conditions. Previous attempts have been made to control the composition of the product mixture formed through the partial oxidation of light hydrocarbons by recycling certain of the reaction products and combining the latter with the fresh feed. Thus compounds, such as alcohols, ketones and esters, were recovered from the product mixture, mixed with the fresh feed to the reactor, and eventually oxidized to acids of the same or approximately the same carbon content. It is apparent, however, that such a method consumes oxygen which otherwise could be used in the partial oxidation of the hydrocarbon. Accordingly, if all of the hydrocarbon was to be converted, sufficient oxygen must be supplied for both the hydrocarbon and for the conversion of the above-mentioned ketones, alcohols and esters into their corresponding acid derivatives.

In my copending application, U. S. Serial No. 477,658, filed December 27, 1954, I have described and claimed a procedure whereby advantage is taken of certain of the phenomena described herein involving controlling the composition of the product mixture by regulating the temperature and hydrogen partial pressure at which said mixture is maintained prior to the quench step.

It is an object of my invention to provide a process for the vapor phase partial oxidation of hydrocarbons whereby the product distribution as to classes can be controlled at will. It is another object of my invention to accomplish the last-mentioned result by injecting into the initial hot gaseous product mixture, wherein the reactions involved in the formation of at least a portion of the products in such mixture are at equilibrium, one or more of a regulated group of compounds capable of influencing said equilibrium in the direction desired. It is still another object of my invention to provide a method whereby maximum conversion of hydrocarbons may be secured in the partial oxidation of hydrocarbons simultaneously with a desirable alteration in product composition without utilization of oxygen in quantities other than that consumed by the partial oxidation of said hydrocarbons. It is a further object of my invention to furnish a commercially practicable process by which the content of aldehydes, alcohols or acids may be selectively decreased or increased as desired.

Broadly, my invention is based upon the discovery that in the vapor phase partial oxidation of hydrocarbons, the following reactions reach equilibrium under the conditions of the process:

(1) $CH_3OH \rightleftharpoons CH_2O + H_2$
(2) $C_2H_5OH \rightleftharpoons CH_3CHO + H_2$
(3) $CH_3COOH \rightleftharpoons 2CO + 2H_2$ At constant pressure, variations in the temperature can readily alter the proportion of products in the equilibrium mixture formed by the product gases. Thus, where a reaction is involved similar to that illustrated by Equation 1, formaldehyde can be increased by recycling methanol to the reaction mixture. If it is desired to increase the methanol content of the product, the formaldehyde should be recycled. The equilibrium constant for this reaction increases roughly 100-fold from a temperature of 600° F. to 900° F. Therefore, since higher temperatures favor an equilibrium mixture having an increased ratio of formaldehyde to methanol, control of the temperature at which the exit gas is quenched as it leaves the reactor, under conditions such that the temperature of the quenched gas is about 900° to 950° F., will result in a product having an increased proportion of formaldehyde over product gases quenched at lower temperatures. On the other hand, if the effluent gas is at a lower temperature when the quenching operation is effected, the proportion of methanol is increased and the formaldehyde concentration is correspondingly decreased. Comparable conditions give similar results in the system illustrated by Equation 2.

Equation 3 involving acetic acid may be forced in the direction of acetic acid formation by the addition of hydrogen and carbon monoxide to the total feed, or by recycling hydrogen and carbon monoxide formed as products. Since this reaction is also quite sensitive to temperature from the standpoint of equilibrium, as low temperatures (500 to 600° F.—noncatalytic conditions) as are practical, should be used to establish equilibrium favorable to acetic acid formation. This reaction differs somewhat from those represented by the first two equations in that the former is substantially more sensitive to pressure. At a given temperature, addition of hydrogen alone to any of the systems represented by the above equations results in increased yields of methanol, ethanol and acetic acid.

Effects similar to those pointed out above are obtained with the same systems when operating at a constant temperature, but at varying pressures. Thus, with decreasing pressure, the formation of aldehydes in Equations 1 and 2 and the formation of carbon monoxide and hydrogen in Equation 3 is increased, while at higher pressures the tendency to form acid in Equation 3 and alcohols in Equations 1 and 2 increases.

The above observations form the basis of an embodiment of my invention involving principally altering the product composition or product distribution obtained from the partial oxidation of light hydrocarbons by recycling one or more of the several classes of compounds under specified conditions to the reaction zone. In carrying out the process of my invention, the desired compound or mixture of compounds is injected into the reactor at a point where very little, if any, free oxygen exists. Of course, the exact point where such condition exists is determined by the contact time employed. This condition can readily be determined by changing the gas flow rate and measuring the oxygen concentration in the effluent gas. The contact time required for substantially complete consumption of the oxygen can readily be obtained from this information. Knowing the contact time employed, the proper point of injection of the desired chemical can easily be ascertained. In this manner, a maximum quantity of the oxygen initially fed to the reactor is available for reaction with the hydrocarbon vapors. Also, by this procedure, introduction of the aforesaid partial oxidation products into the reactor does not in any way interfere with the principal oxidation reaction. This procedure does, however, provide conditions which take advantage of the fact that various reactions involved in the vapor phase partial oxidation process are at equilibrium. Therefore, the formaldehyde, ethanol, methanol, acetaldehyde or acetic acid content of the final product under given conditions of temperature and pressure can be controlled by recycling the appropriate compound or compounds in accordance with my invention.

While the process of my invention may be used to upgrade the products or to control the product distribution secured in the vapor phase partial oxidation of hydrocarbons by recycling a certain class or classes of compounds to the reactor as mentioned above, I also contemplate injection of suitable compounds into the reactor wherein such compounds are derived from sources other than the partial oxidation reaction itself. Thus, for example, if it is desired to produce large quantities of acetic acid, I may independently produce carbon monoxide and hydrogen by any suitable method as, for example, by reforming a light hydrocarbon with steam in a known manner or by the partial combustion of methane. Such gaseous product mixture is then injected at a point in the reactor where very little oxygen is present, and, in accordance with Equation 3 above, conditions are created which favor the formation of acetic acid. If desired, injection of the hydrogen and carbon monoxide mixture or mixtures of any of the chemicals which it is desired to convert may be effected in a separate reactor, i. e., the primary products of partial oxidation, less appreciable quantities of free oxygen, may be conducted from a first reactor to a second vessel into which is also introduced the chemicals capable of effecting the above-mentioned equilibria in the desired direction. In the event the use of a separate vessel for mixing any one or a mixture of the aforesaid compounds with the product gas from a conventional partial oxidation process is desired, it is to be understood that the temperature prevailing in said vessel should lie within a range of from about 400° to about 1,000° F. and preferably within a range of about 500° to 900° F. Within the aforesaid temperature ranges, the reactions illustrated by the equations listed above are at equilibrium and, of course, under such circumstances, the composition of the ultimate product mixture may be controlled by the nature and quantity of component or components injected into said separate vessel. In this connection, as pointed out in my copending application, U. S. Serial No. 477,658, referred to above, higher temperatures favor equilibrium mixtures containing increased amounts of aldehydes, whereas, generally speaking, temperatures toward the lower end of the aforesaid range favor increased quantities of alcohols. After equilibrium has been attained, the resulting product mixture may be quenched in accordance with any of several methods well known to the art. Obviously, in place of the hydrogen and carbon monoxide mixture mentioned above, the other alcohols and aldehydes shown in Equations 1 and 2 may be substituted and the source of the injected compound or compounds is immaterial to the operation of my invention.

It will be appreciated that the principles of my invention can be applied to the partial oxidation of a wide number of hydrocarbons, including gaseous, liquid and solid hydrocarbons. In the case of solid hydrocarbons, the latter may be first melted and then introduced into the reaction zone in the form of a mist; or if a solid hydrocarbon source, such as coal, is employed, it should generally be finely pulverized in order to insure adequate contact with the oxygen in the reaction zone. It is also to be pointed out that the process of my invention is essentially restricted to the use of hydrocarbon-rich systems, i. e., reaction mixtures in which the free oxygen is present in concentrations not in excess of about 25 or 30 percent of the total hydrocarbon-oxygen mixture and the appended claims are to be so construed.

The process of my invention may be further explained by reference to the accompanying flow diagram wherein oxygen and a light hydrocarbon, such as for example butane, in lines 2 and 4, respectively, are separately preheated to a temperature of about 500° F. in heaters 6 and 8. These separately preheated streams are then combined and introduced into reactor 10 through line 12 where reaction of the gaseous components is initiated, generating a temperature in the neighborhood of 800° to 900° F. Total pressure within the reactor may vary from atmospheric to 800 or 1,000 p. s. i. In general, I prefer to use pressures of from about 100 to 300 p. s. i. After the oxygen in the reaction mixture has been substantially consumed, recycle gases (substantially free from partial oxidation products) and/or selected oxygenated chemicals obtained from a subsequent step in the process are injected into the reactor through lines 13 and 14, respectively. The quantity of recycled products injected at this point may vary from only a small portion of such products produced by the partial oxidation process to the entire quantity of products, such as methanol, ethanol, formaldehyde, acetaldehyde, hydrogen and carbon monoxide produced in said process, depending, of course, on the type and quantity of product or products ultimately desired. The principal requirements in this connection are that said products be introduced into a zone of the reactor containing substantially no free oxygen and that said products be permitted to remain in the reactor for a time sufficient for the previously indicated equilibrium to be reached at the temperature and other reaction conditions employed. Usually this is accomplished by employing residence times of from about .5 to about 10 seconds. After equilibrium has been reached, the gaseous mixture is immediately withdrawn from the reactor through line 16 and cooled or quenched in unit 18 to a temperature of not more than about 400° F. and preferably down to about 80° to about 100° F. The cooled product mixture which now consists of both liquid and gaseous components is transferred to receiver 20, also under a pressure sufficient to maintain the butane in the liquid phase at the temperature of the cooled product. The latter stratifies into two layers, a lower aqueous layer containing product chemicals and an upper layer consisting principally of liquid butane. The aqueous chemical layer is withdrawn from the receiver through line 22 and subjected to a series of separation and purification steps, generally indicated by chemical separation section 24. From this separation section, product chemicals are removed and sent to further processing through line 26, if desired, or a portion of this stream may be recycled to reactor 10 via line 14, previously mentioned. A liquid butane layer is withdrawn through line 28 and transferred to scrubber 30 where water-soluble chemicals are washed out of the butane by a descending stream of water entering the top of the cooler through line 32. An aqueous stream of chemicals is taken from the base of scrubber 30 and sent through line 34 to chemical separation section 24. Water-washed liquid butane is taken from the top of scrubber 30 through line 36 and returned to the system via line 4. Gas from receiver 20 containing hydrogen, carbon monoxide, carbon dioxide, some low-boiling chemicals and light hydrocarbons, is taken overhead through line 38 to scrubber 40 where said gas is countercurrently scrubbed with water entering from the top of the cooler through line 42. A stream containing water-soluble low-boiling chemicals is taken from the bottom of the cooler through line 32 and used for the scrubbing operation in column 30, previously referred to. Gases issuing from the top of scrubbing column 40 consist essentially of hydrogen, carbon monoxide, carbon dioxide and light hydrocarbons and may be recycled back through line 13 to reactor 10 to the second half thereof when it is desired to increase the ratio of acetic acid, ethanol or methanol to other components in the product mixture. Also, hydrogen from an outside source may be added to the system via line 44. A portion of the gas in line 13 is vented through line 46 and, if expedient, may be used as plant fuel.

The process of my invention may be further illustrated by the following specific example.

Example

In order to demonstrate the efficiency and advantages of my invention, a series of three runs is conducted; the first, employing no recycle; the second, recycling the uncondensable gas stream from the water scrubbing operation to the second half of the partial oxidation reactor; and the third run, involving recycling formaldehyde and acetaldehyde to the reactor in accordance with my invention. The composition of the total feed, as well as the temperature and pressure used in each run, are indicated below. Also the composition of the product mixtures secured under the three different sets of conditions used is shown, together with the percentage increase or decrease in various of the end products. In runs 1, 2 and 3, a residence time of .5 second is employed in order to permit equilibrium to be reached. Immediately thereafter, the aqueous product mixtures are quenched to a temperature of about 80° F.

TABLE

| | Run #1 | Run #2 | Run #3 |
|---|---|---|---|
| Percent Oxygen, Total Feed | 9.5 | 9.5 | 9.5 |
| Percent Butane, Total Feed | 90.5 | 90.5 | 90.5 |
| Contact Time, Seconds | 0.5 | 0.5 | 0.5 |
| Pressure, p. s. i. | 117 | 117 | 117 |
| Temperature, °F | 700 | 700 | 700 |
| Percent Oxygen Selectivity to Chemicals | 45.6 | 45.6 | 45.6 |
| Net Product Chemicals—Chemical Distribution, Percent: | | | |
| CH₂O | 35.0 | 23.0 | 22.0 |
| CH₃OH | 35.0 | 47.0 | 48.0 |
| CH₃CHO | 19.2 | 18.6 | 18.5 |
| C₂H₅OH | 0.8 | 1.6 | 1.7 |
| CH₃COOH | 0.006 | 0.4 | |
| Other Chemicals | 10.0 | 9.4 | 9.8 |
| Total | 100 | 100 | 100 |
| Ratio, Recycle: Fresh Feed Plus Recycled Butane | 0 | 2.4 | 0.4 |
| Percent Decrease, Aldehydes: | | | |
| CH₂O | | 34 | 37 |
| CH₃CHO | | 3 | 4 |
| Percent Increase, Alcohols: | | | |
| CH₃OH | | 34 | 37 |
| C₂H₅OH | | 100 | 112 |
| Ratio of Aldehydes: Alcohols in Tail Gas: | | | |
| CH₂O/CH₃OH | 1/1 | 0.5/1 | 6.7/1 |
| CH₃CHO/C₂H₅OH | 24/1 | 11.6/1 | 160/1 |
| H₂ Partial Pressure at Exit of Reactor, Atmosphere | 0.1 | 0.2 | 0.015 |
| CO/H₂ Ratio in Tail Gas | 5/1 | 5/1 | 5/1 |
| Composition Recycle Gas, Percent: | | | |
| H₂ | | 3.5 | |
| CO | | 62.2 | CH₂O — 54.6% |
| CO₂ | | 4.3 | CH₃CHO — 45.4% |
| Light Hydrocarbons | | 30.0 | |
| Total | | 100 | 100 |

From the data appearing above, a very substantial increase in both methanol and ethanol is observed in run No. 2, where uncondensed gases are recycled to the reactor. This result is accompanied by a decrease in aldehyde content of the product mixture over that obtained in run No. 1. Likewise, in run No. 3, it will be seen that by recycling both formaldehyde and acetaldehyde, in accordance with my invention, the concentration of methanol and ethanol is appreciably increased over the amount produced by the conditions of run No. 1.

In view of the foregoing disclosure, numerous modifications in the process described herein will be obvious to one skilled in the art. In general, it may be said that the recycling or injection of any of the components normally produced in the partial oxidation of hydrocarbons into the reaction vessel in accordance with the conditions provided herein, or obvious variations thereof, is to be construed as lying within the scope of my invention.

I claim:

1. In a process for altering the concentration of one of the oxygenated organic compounds selected from the group consisting of formaldehyde, acetaldehyde, methanol, ethanol and acetic acid, present in a mixture formed by the vapor phase partial oxidation of hydrocarbons in a reaction zone, the improvement which comprises injecting into a zone containing said mixture, in which the oxygen content thereof is substantially less than the oxygen content of the total feed to said reaction zone, a component of the type produced in said partial oxidation process selected from the group consisting of hydrogen, carbon monoxide, formaldehyde, acetaldehyde, methanol, ethanol and acetic acid, permitting equilibrium to be established with respect to at least one of the following reactions $$CH_3OH \rightleftharpoons CH_2O + H_2$$
$$C_2H_5OH \rightleftharpoons CH_3CHO + H_2$$
$$CH_3COOH \rightleftharpoons 2CO + 2H_2$$

the number of components so injected being no more than the number of reactions allowed to reach equilibrium and each of the components added corresponding to a reactant in each of said reactions reaching equilibrium, at a temperature ranging from about 400° to about 1000° F., and thereafter rapidly quenching the resulting gaseous products to secure a mixture in which one of said compounds is present in increased ratio with respect to the concentration thereof in the original mixture.

2. In a process for altering the concentration of methanol in a formaldehyde-containing mixture formed by the vapor phase partial oxidation of hydrocarbons in a reaction zone, the improvement which comprises injecting formaldehyde into a zone containing said mixture in which the oxygen content thereof is substantially less than the oxygen content of the total feed to said reaction zone, permitting the reaction $$CH_3OH \rightleftharpoons CH_2O + H_2$$

to reach equilibrium at a temperature ranging from about 500° to about 950° F., and thereafter rapidly quenching the resulting gaseous products to secure a mixture in which methanol is present in increased ratio to the formaldehyde in the mixture thus recovered.

3. In a process for increasing the concentration of methanol and ethanol in formaldehyde and acetaldehyde-containing mixtures formed by the vapor phase partial oxidation of hydrocarbons in a reaction zone under known conditions, the steps which comprise injecting formaldehyde and acetaldehyde into a portion of said zone in which the oxygen content thereof is substantially less than the oxygen content of the total feed to said zone, permitting the reactions $$CH_3OH \rightleftharpoons CH_2O + H_2$$
$$CH_3CH_2OH \rightleftharpoons CH_3CHO + H_2$$

to reach equilibrium at a temperature ranging from about 500° to about 950° F., and thereafter rapidly quenching the resulting gaseous products to secure a mixture in which both methanol and ethanol are present in increased ratios to the formaldehyde and acetaldehyde present in the mixture thus recovered.

4. In a process for altering the concentration of ethanol of an acetaldehyde-containing mixture formed by the vapor phase partial oxidation of hydrocarbons in a reaction zone, the improvement which comprises injecting acetaldehyde into a portion of said zone in which the oxygen content thereof is substantially less than the oxygen content of the total feed to said zone, permitting the reaction $$CH_3CH_2OH \rightleftarrows CH_3CHO + H_2$$

to reach equilibrium at a temperature ranging from about 500° to about 950° F., and thereafter rapidly quenching the resulting gaseous products to secure a mixture in which ethanol is present in increased ratio to the acetaldehyde in the mixture thus recovered.

5. In a process for increasing the concentration of methanol, ethanol and acetic acid, present in a mixture containing in addition to the aforesaid compounds formaldehyde and acetaldehyde, said mixture having been formed by the vapor phase partial oxidation of hydrocarbons in a reaction zone, the improvement which comprises injecting hydrogen into a portion of said zone in which the oxygen content thereof is substantially less than the oxygen content of the total feed to said zone during said partial oxidation process, permitting equilibrium to be established at a temperature ranging from about 500° to about 950° F. with respect to the reactions involved in the formation of methanol, ethanol and acetic acid in said partial oxidation process, and thereafter rapidly quenching the resulting gaseous products to secure a mixture containing methanol, ethanol and acetic acid in increased ratios to the remaining components of the mixture thus recovered.

6. In a process for an increase in the concentration of acetic acid present in a mixture formed by the vapor phase partial oxidation of hydrocarbons in a reaction zone under known conditions, the improvement which comprises injecting a mixture consisting essentially of hydrogen and carbon monoxide into a portion of said zone in which the oxygen content thereof is substantially less than the oxygen content of the total feed to said zone, permitting the reaction $$CH_3COOH \rightleftarrows 2CO + H_2$$

to reach equilibrium at a temperature ranging from about 500° to about 950° F., and thereafter rapidly quenching the resulting gaseous products to secure a mixture containing an increased amount of acetic acid.

7. In a process for increasing the concentration of acetaldehyde present in a mixture formed by the vapor phase partial oxidation of hydrocarbons in a reaction zone, the improvement which comprises injecting ethanol into a portion of said zone in which the oxygen content thereof is substantially less than the oxygen content of the total feed to said zone, permitting the reaction $$C_2H_5OH \rightleftarrows CH_3CHO + H_2$$

to reach equilibrium at a temperature ranging from about 500° to about 950° F., and thereafter rapidly quenching the resulting gaseous products to secure a mixture containing an increased amount of acetaldehyde.

8. In a process for increasing the concentration of formaldehyde present in a mixture formed by the vapor phase partial oxidation of hydrocarbons in a reaction zone, the improvement which comprises injecting methanol into a portion of said zone in which the oxygen content thereof is substantially less than the oxygen content of the total feed to said zone, permitting the reaction $$CH_3OH \rightleftarrows CH_2O + H_2$$

to reach equilibrium at a temperature ranging from about 500° to about 950° F., and thereafter rapidly quenching the resulting gaseous products to secure a mixture containing an increased amount of formaldehyde.

9. The process of claim 1 wherein said component is injected into a second zone containing no free oxygen and which is separate and independent from said reaction zone.

10. The process of claim 2 wherein formaldehyde is injected into a second zone containing no free oxygen and which is separate and independent from said reaction zone.

11. The process of claim 4 wherein acetaldehyde is injected into a second zone containing no free oxygen and which is separate and independent from said reaction zone.

12. The process of claim 5 in which hydrogen is injected into a second zone containing no free oxygen and which is separate and independent from said reaction zone.

References Cited in the file of this patent

UNITED STATES PATENTS

| | | |
|---|---|---|
| 2,186,688 | Walker | Jan. 9, 1940 |
| 2,265,948 | Loder | Dec. 9, 1941 |
| 2,270,779 | Berl | Jan. 20, 1942 |
| 2,376,668 | Derby | May 22, 1945 |
| 2,392,316 | Dreyfus | Jan. 8, 1946 |
| 2,570,215 | Dice | Oct. 9, 1951 |